(12) United States Patent
Maltson

(10) Patent No.: US 8,628,292 B2
(45) Date of Patent: Jan. 14, 2014

(54) ECCENTRIC CHAMFER AT INLET OF BRANCHES IN A FLOW CHANNEL

(75) Inventor: John David Maltson, Skellingthorp (GB)

(73) Assignee: Siemens Aktiengesellschaft, Munich (DE)

( * ) Notice: Subject to any disclaimer, the term of this patent is extended or adjusted under 35 U.S.C. 154(b) by 1121 days.

(21) Appl. No.: 12/532,503

(22) PCT Filed: Mar. 27, 2008

(86) PCT No.: PCT/EP2008/053642
§ 371 (c)(1),
(2), (4) Date: Sep. 22, 2009

(87) PCT Pub. No.: WO2008/116906
PCT Pub. Date: Oct. 2, 2008

(65) Prior Publication Data
US 2010/0115967 A1    May 13, 2010

(30) Foreign Application Priority Data

Mar. 28, 2007   (EP) .................................. 07006444

(51) Int. Cl.
*F03B 11/00* (2006.01)
(52) U.S. Cl.
USPC ............. 415/115; 60/805; 60/806; 416/96 A; 416/96 R; 416/97 R

(58) Field of Classification Search
USPC ......... 60/805, 806; 415/115; 416/96 R, 96 A, 416/97 R
See application file for complete search history.

(56) References Cited

U.S. PATENT DOCUMENTS

| | | | |
|---|---|---|---|
| 4,199,936 A | 4/1980 | Cowan et al. | |
| 4,738,588 A | 4/1988 | Field | |
| 4,992,025 A * | 2/1991 | Stroud et al. ................ | 416/97 R |
| 5,059,093 A | 10/1991 | Khalid | |
| 5,192,192 A | 3/1993 | Ourhaan | |
| 5,458,461 A * | 10/1995 | Lee et al. ..................... | 416/97 R |
| 5,688,104 A * | 11/1997 | Beabout ....................... | 415/115 |
| 6,241,468 B1 * | 6/2001 | Lock et al. ................... | 415/115 |
| 6,511,762 B1 * | 1/2003 | Lee et al. ..................... | 428/697 |
| 7,059,825 B2 * | 6/2006 | Magowan et al. ........... | 415/115 |

FOREIGN PATENT DOCUMENTS

| | | |
|---|---|---|
| EP | 0365195 A2 | 4/1990 |
| EP | 1686240 A1 | 8/2006 |
| SU | 365481 A1 | 1/1973 |

OTHER PUBLICATIONS

Communication From Russian Patent Office, Mar. 14, 2012, pp. 1-4.

\* cited by examiner

*Primary Examiner* — Phutthiwat Wongwian
*Assistant Examiner* — Craig Kim

(57) ABSTRACT

A flow channel with a branch channel perpendicular to a main channel including an edge defining an inlet opening of the branch channel is provided. A chamfer is disposed at the upstream edge of the inlet opening and a straight edge is disposed at the downstream edge of the inlet opening, perpendicular to the main channel.

6 Claims, 4 Drawing Sheets

ECCENTRIC CHAMFER AT INLET OF BRANCHES IN A FLOW CHANNEL

CROSS REFERENCE TO RELATED APPLICATIONS

This application is the US National Stage of International Application No. PCT/EP2008/053642, filed Mar. 27, 2008 and claims the benefit thereof. The International Application claims the benefits of European Patent Office application No. 07006444.9 EP filed Mar. 28, 2007, both of the applications are incorporated by reference herein in their entirety.

FIELD OF INVENTION

The present invention relates to a flow channel with a branch channel for effective use of cross flow under suppression of turbulences.

BACKGROUND OF INVENTION

Fluids like liquids or gases have to be transported via flow channels in numerous technical applications. Flow channels often contain branches, which have a flow direction substantially perpendicular to the flow direction of a main flow channel, for a flow separation where cross flows are used. At such branch turbulences usually develop at the edges of the inlet and cause unwanted pressure losses. One method to reduce the turbulences is the chamfering of the edges of the inlet.

EP 0 365 195 A2 shows a variety of configurations for convergent-divergent film cooling holes with frusto-conical portions connected at their narrowest parts, together with the hole drilling methods necessary to achieve the configurations.

EP 1 686 240 A1 shows cooling holes where the regions of a pointed edge are broken along the periphery, so that a flat portion is made available in the region.

Hot gas path components are one application for cross flows. These components are exposed to high temperatures and have to be cooled. Especially the hot gas components of a gas turbine, like turbine blades or vanes, are often continuously cooled, where film and impingement cooling plays a considerable role. For film cooling the component has to be hollow and holes connect the inside with the outside of the component. This provides that the cooling flow from the inside enters the holes and generates a thin cooling film also at the outside of the blade. The here applied cross flow through the holes is subjected to the already mentioned unwanted pressure losses, which may reduce the effectiveness of the film cooling. The same is valid for the impingement cooling, where the flow is blown out through holes in a wall of a flow channel so as to impinge on the back side of the wall to be cooled.

SUMMARY OF INVENTION

It is therefore an objective of the present invention to provide a flow channel with a branch channel having a flow direction substantially perpendicular to the flow direction of a main flow channel which overcomes the mentioned short comings in the state of art. It is a further objective of the present invention to provide an advantageous turbine component.

These objectives are solved by a flow channel as claimed in the claims and a turbine component as claimed in the claims. The depending claims define further developments of the invention.

An inventive flow channel comprises an edge defining an inlet opening of a branch channel, characterised by a chamfer at the upstream edge of the inlet opening and a sharp downstream edge of the inlet opening. Generally in the branch channel the flow direction is perpendicular or substantially perpendicular to the flow direction of a main flow channel. The invention is based on the following observation:

Turbulences usually develop at the upstream edges of the inlet opening. The upstream edge of an inlet opening is the edge on the side of the inlet, where the cross flow fluid comes from. The flow sees a very tight corner to flow around, separates from this corner and generates turbulences. In the state of art, turbulences are reduced by providing a chamfer at the inlet opening's edge. However, chamfered downstream edges decrease the effective cross flow through the branch, which is also an undesired result. With the upstream edges of the inlet opening being chamfered or curved and the downstream edges being sharp the unwanted turbulences can still be reduced while at the same time maintaining the effectiveness of the cross flow. This allows an optimised cross flow through the branch. Optimising the cross flow can for example lead to an increased efficiency of impingement cooling due to increased jet strength which results from reduced flow separation and shearing in the hole.

The inventive inlet opening can be realised by an eccentric or a centric chamfer, respectively. Generally the inlet opening may have any cross section, for example a round, elliptic, semicircular, square or rectangular cross section.

An inventive turbine component, which may be a gas turbine component, comprises an internal flow channel with an edge defining an inlet opening of the branch channel, characterised by a chamfer at the upstream edge of the inlet opening and a sharp downstream edge of the inlet opening.

The branch channel can be a through hole through a wall of the gas turbine component. This through hole may be a film cooling hole, an impingement cooling hole, or a flow receiver hole, for example in a turbine rotor. Further, the turbine component comprising an inventive internal flow channel can be implemented as a gas turbine blade, wall or vane.

Moreover, the inventive hole can be applied as an impingement cooling hole for nozzle guide vane cooling or rotor blade cooling, for example in an aerofoil or in an endwall. It can generally be applied to gas turbine wall cooling in a combustor transition duct or interduct components. The impingement hole can be manufactured in an impingement tube or impingement plate and fitted to a nozzle guide vane or rotor blade to form an assembly.

Generally, the inventive chamfer can be manufactured by Electrical Discharge Machining, Electro Chemical Machining, or casting.

The advantage of the inventive flow channel and the inventive turbine component lies in the prevention of pressure losses in flow channels by suppression of turbulences, especially for cross flow applications. Moreover, the increased jet strength, which results from reduced flow separation and shearing within the hole, increases the heat transfer coefficient.

BRIEF DESCRIPTION OF THE DRAWINGS

Further features, properties and advantages of the present invention will become clear from the following description of embodiments in conjunction with the accompanying drawings.

DETAILED DESCRIPTION OF INVENTION

Figure 1:
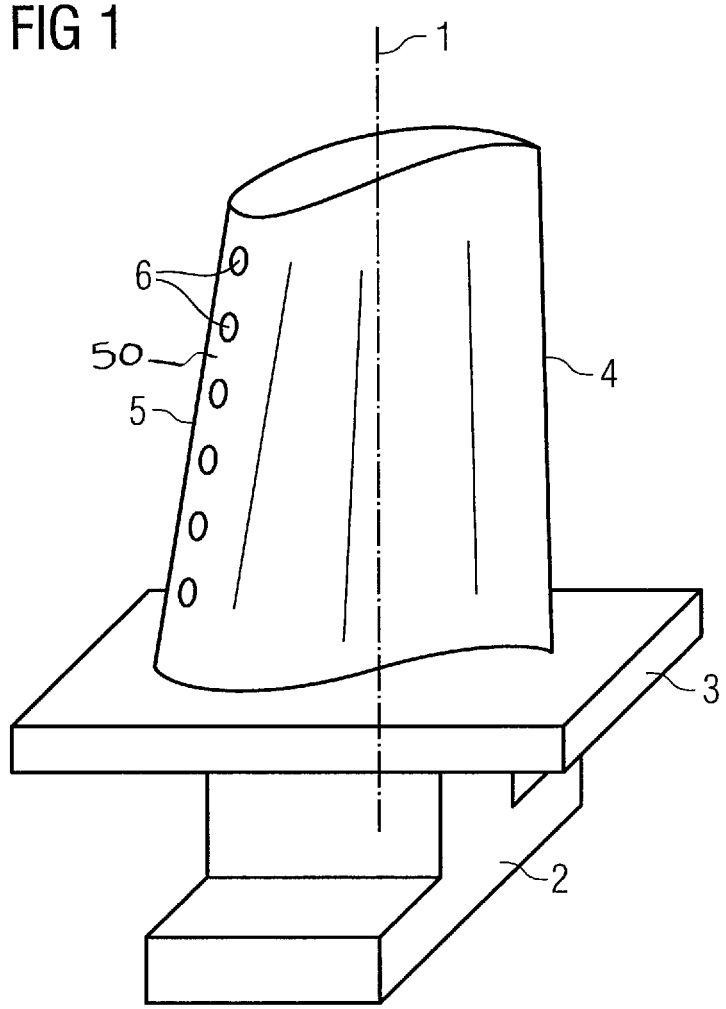
FIG. 1 schematically shows a rotor blade of a flow channel in a perspective view.

FIG. 1 shows the perspective view along the centerline 1 of a turbine rotor blade. The turbine can be a gas turbine of an aircraft or of an electric power station, a steam turbine or a compressor. The rotor blade consists of a root 2 as a fixing component, a blade platform 3 and an airfoil 4. For the here described embodiment a gas turbine blade is considered. Such a blade is exposed to hot combustion gases during operation of the gas turbine. Therefore, it is hollow for cooling. At the leading edge 5 film cooling holes 6 are located, which allow cooling air to exit the blade and to form a film of air over the blade's surface which works against a direct contact between the combustion gas and the surface. Such cooling holes represent branch channels of the internal flow channel for the cooling air.

In addition, the blade is also equipped with internal cooling air ducts and impingement holes extending through the cooling duct walls. The internal cooling duct is not visible in the figure. Through the impingement holes the cooling air is blown into a space between the internal cooling air duct and the inside of the blade's outer wall 50 so as to impinge on the inside of the outer wall 50. After the impingement the air may flow through the space between the cooling air duct and the outer wall 50 to film cooling holes through which the cooling air is then discharged. Both, the cooling air duct with the impingement holes and the space between the cooling air duct and the outer wall 50 with the film cooling holes may be implemented as an inventive flow channel with a branch channel.

Figure 2:
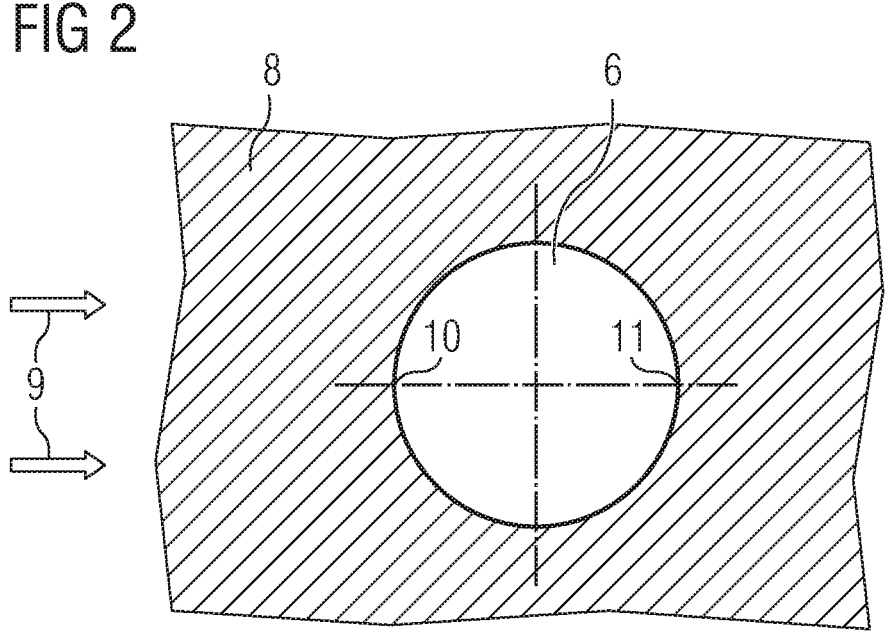
FIG. 2 shows a state of the art film cooling hole of a rotor blade in top view.
Figure 3:
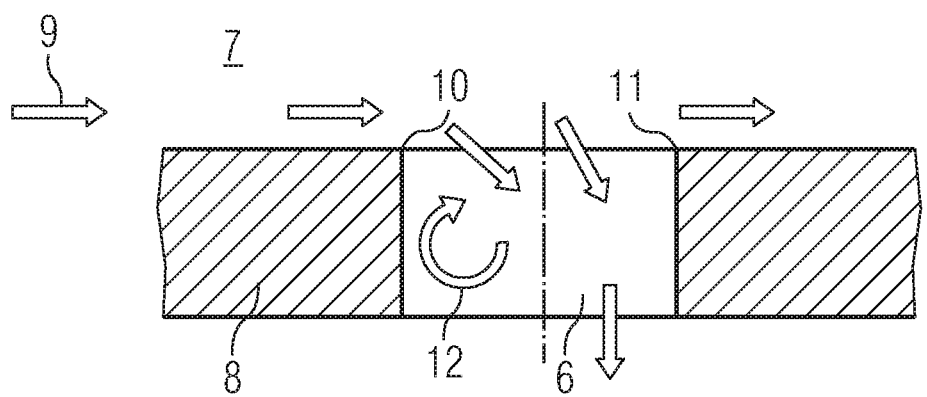
FIG. 3 shows the film cooling hole of FIG. 2 in a sectional view along the longitudinal axis of the cooling hole.

A top view of a state of the art film cooling or impingement hole 6, in the following simply referred to as hole 6, from the inside of a hollow gas turbine rotor blade or the cooling air duct, respectively, is shown in FIG. 2. In FIG. 3 one can see a sectional view along the longitudinal axis of a hole 6 through the blade's wall 8 at the location of a hole 6. In the hole 6 the flow direction is perpendicular to the flow direction of a main flow channel 7. The arrows 9 indicate the direction of the cooling fluid flow. The incoming cross flow enters the hole at the sharp upstream edge 10 and turbulences 12 arise behind this sharp edge. Reference numeral 11 indicates the downstream edge.

Figure 4:
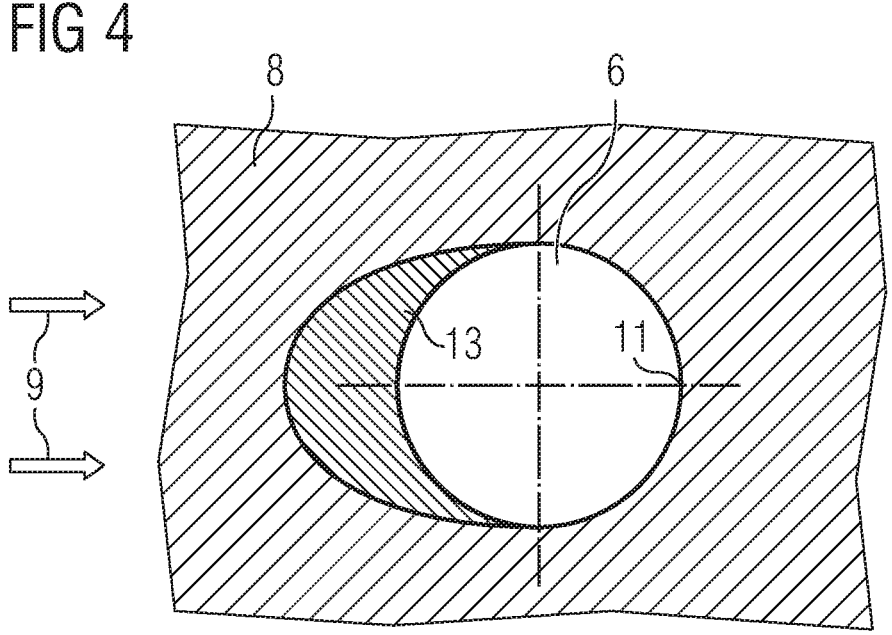
FIG. 4 shows, as a first example for the inventive flow channel, a film cooling hole of a rotor blade with a chamfer at the upstream edge and a sharp downstream edge at the inlet in top view.
Figure 5:
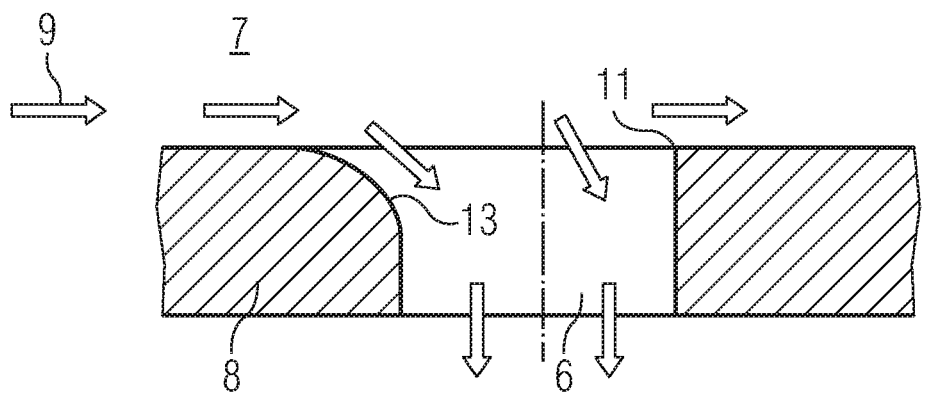
FIG. 5 shows the film cooling hole of FIG. 4 in a sectional view along the longitudinal axis of the cooling hole.

The turbulences are avoided by the design of the flow channel, in particular the design of the cooling hole's inlet opening, i.e. by the inventive inlet that has an eccentric chamfer at the inlet opening's upstream edge. The eccentric chamfer is machined by reduced Electrical Discharge Machining. FIG. 4 shows, as first embodiment of the invention, a top view of an eccentric chamfered film cooling hole 6 from the inside of the hollow gas turbine rotor blade. FIG. 5 shows the film cooling hole 6 of FIG. 4 in a sectional view along the longitudinal axis of the cooling hole 6. Elements corresponding to elements of FIGS. 2 and 3 will be designated with the same reference numeral and will not be described again. The eccentric chamfer 13 at the upstream edge causes a laminar or a streamline flow without turbulences and unwilling pressure losses. The downstream edge 11 of the inlet is kept sharp to provide an effective use of the cross flow.

Figure 6:
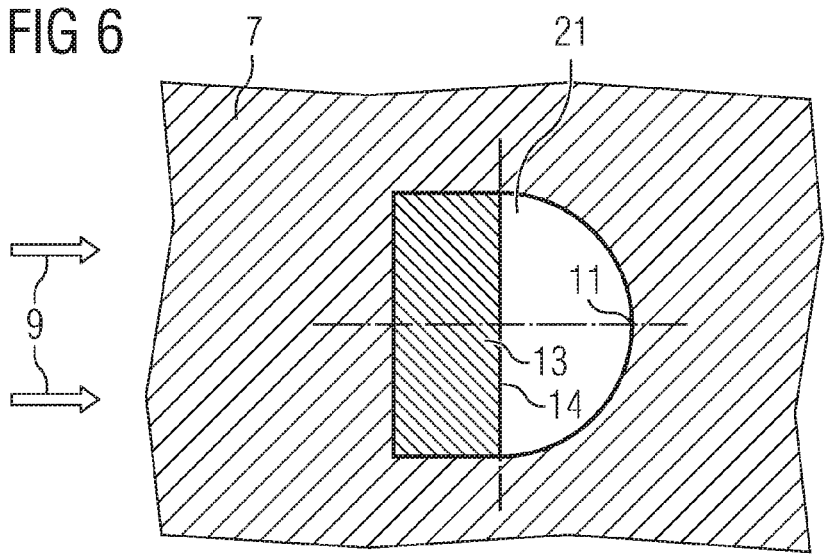
FIG. 6 shows the top view of an inventive inlet from a pipeline to a separate branch.
Figure 7:
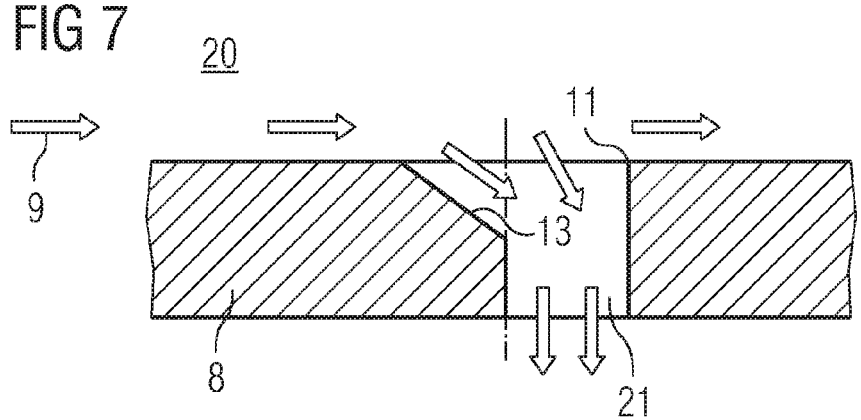
FIG. 7 shows the inlet from a pipeline to a separate branch of FIG. 6 in a sectional view along the longitudinal axis of the inlet.

Now a second embodiment of the inventive inlet will be described with reference to FIGS. 3, 6 and 7. Regarding the description of the FIG. 3 it is here referred to the description of the first embodiment. Elements in FIGS. 6 and 7 corresponding to elements of FIGS. 2 and 3 will be designated with the same reference numeral and will not be described again.

Fluid fuel used in a combustor of a gas turbine may be transported in a pipeline with a separate branch 21 perpendicular to a main branch 20. Without the inventive inlet from the main branch 20 to the separate branch 21 turbulences as sketched in FIG. 3 occur behind the upstream edge and cause pressure losses. This effect can be suppressed by chamfering the upstream edge 13 as shown in FIGS. 6 and 7. FIG. 6 shows a top view of an inventive inlet from a main branch 20 to a separate branch 21. The inlet has a semicircular cross section and is chamfered 13 at the straight line edge 14. FIG. 7 shows the inlet from a pipeline to a separate branch of FIG. 6 in a sectional view along the longitudinal axis of the inlet.

A third embodiment of the inventive inlet, which represents an impingement hole will, now be described with reference to FIGS. 4 and 8. Regarding the description of the FIG. 4 it is here referred to the description of the first embodiment. Elements in FIG. 8 corresponding to elements of FIG. 5 will be designated with the same reference numeral and will not be described again.

Figure 8:
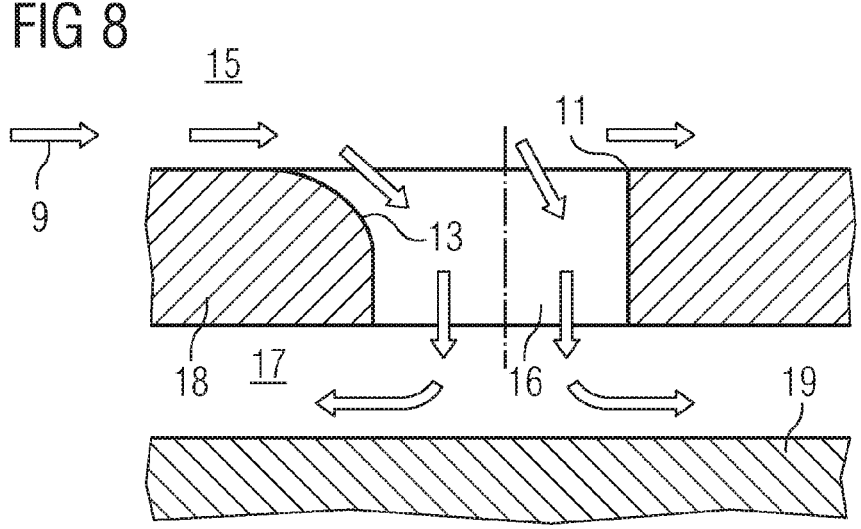
FIG. 8 shows the inlet of an impingement cooling hole in a sectional view along the longitudinal axis of the inlet.

FIG. 8 shows the inlet of an impingement cooling hole 16 of a gas turbine component in a sectional view along the longitudinal axis of the inlet. Also visible in the figure is the wall 18 of the cooling fluid duct 15 which is, in the present embodiment, a cooling air duct, and the inner side of an outer wall 15 of the turbine component. A space 17 is formed between the wall 18 of the cooling air duct 15 and the inner side of the turbine component's outer wall 19 through which cooling fluid, i.e. cooling air in the present embodiment, can be ducted away from the impingement hole 16 after impingement on the inner side of the turbine component's outer wall 19. The space may lead the air to film cooling holes extending through the outer wall 19 as they are shown and described in the first embodiment.

Also in the holes 6 of the third embodiment the eccentric chamfer 13 increases jet strength, because of a reduced flow separation and shearing within the hole. Therefore the heat transfer coefficient is increased. The top view of the impingement cooling hole of FIG. 8 has the same structure as shown in FIG. 4. The eccentric chamfer 13 can be manufactured by Electrical Discharge Machining, Electro Chemical Machining, or casting.

The impingement cooling hole can be applied for nozzle guide vane cooling or rotor blade cooling, for example in an aerofoil or in an end wall. Further, it can be applied to gas turbine wall cooling in a combustor transition duct or inter-duct components. The impingement hole can be manufactured in an impingement tube or impingement plate and fitted to a nozzle guide vane or rotor blade to form an assembly.

Although different geometric shapes have been described with respect to the film cooling holes and the impingement holes on the one hand and the inlet of the separate branch on the other hand, the geometrics are in general interchangeable.

The invention claimed is:
1. A gas turbine component, comprising:
an internal flow channel, comprising:
- a main channel,
- a branch channel in which a first flow direction is perpendicular to a second flow direction of the main channel, the branch channel being defined by a through hole through a wall of the gas turbine component, the through hole being a film cooling hole, or an impingement cooling hole, or a flow receiver hole, and
- an inlet opening of the branch channel, wherein the inlet opening is disposed in a first wall of the main channel and is defined by an edge comprising an upstream edge and a downstream edge,
wherein a chamfer is disposed at the upstream edge, and
wherein the downstream edge is a sharp edge formed by a right angle between a second wall of the branch channel and the first wall.

2. The gas turbine component as claimed in claim 1, wherein the gas turbine component is a nozzle guide vane or rotor blade and the wall of the gas turbine component is an outer wall of said nozzle guide vane or rotor blade.

3. The gas turbine component as claimed in claim 1, wherein the chamfer is manufactured by Electrical Discharge Machining, Electro Chemical Machining, or casting.

4. The gas turbine component as claimed in claim 1, wherein the gas turbine component is implemented as a gas turbine blade or vane, or as a combustor component.

5. The gas turbine component as claimed in claim 1, wherein the chamfer at the upstream edge has a shape that is eccentric with respect to a longitudinal axis of the branch channel.

6. The gas turbine component as claimed in claim 1, wherein the inlet opening has a round, elliptic, semicircular, square or rectangular cross section.

* * * * *